(12) United States Patent
Yun et al.

(10) Patent No.: US 10,108,606 B2
(45) Date of Patent: Oct. 23, 2018

(54) AUTOMATIC INTERPRETATION SYSTEM AND METHOD FOR GENERATING SYNTHETIC SOUND HAVING CHARACTERISTICS SIMILAR TO THOSE OF ORIGINAL SPEAKER'S VOICE

(71) Applicant: ELECTRONICS AND TELECOMMUNICATIONS RESEARCH INSTITUTE, Daejeon (KR)

(72) Inventors: Seung Yun, Daejeon (KR); Ki Hyun Kim, Daejeon (KR); Sang Hun Kim, Daejeon (KR); Yun Young Kim, Daejeon (KR); Jeong Se Kim, Daejeon (KR); Min Kyu Lee, Daejeon (KR); Soo Jong Lee, Daejeon (KR); Young Jik Lee, Daejeon (KR); Mu Yeol Choi, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 24 days.

(21) Appl. No.: 15/214,215

(22) Filed: Jul. 19, 2016

(65) Prior Publication Data
US 2017/0255616 A1   Sep. 7, 2017

(30) Foreign Application Priority Data
Mar. 3, 2016   (KR) .................. 10-2016-0025685

(51) Int. Cl.
*G06F 17/28*   (2006.01)
*G10L 13/033*   (2013.01)
(Continued)

(52) U.S. Cl.
CPC ...... *G06F 17/2872* (2013.01); *G10L 13/0335* (2013.01); *G10L 13/06* (2013.01); *G10L 25/24* (2013.01); *G10L 25/75* (2013.01)

(58) Field of Classification Search
CPC .. G06F 17/28; G06F 17/2809; G06F 17/2818; G06F 17/2827; G06F 17/2872; G06F 17/2881; G06F 17/289; G06F /
(Continued)

(56) References Cited

U.S. PATENT DOCUMENTS 6,330,538 B1 *  12/2001  Breen ............... G10L 13/08
                                                          704/260
8,073,677 B2   12/2011  Furihata et al.
(Continued)

FOREIGN PATENT DOCUMENTS

JP         4213755 B2      1/2009
KR   10-2010-0068965 A    6/2010

*Primary Examiner* — Qi Han

(57) ABSTRACT

Provided are an automatic interpretation system and method for generating a synthetic sound having characteristics similar to those of an original speaker's voice. The automatic interpretation system for generating a synthetic sound having characteristics similar to those of an original speaker's voice includes a speech recognition module configured to generate text data by performing speech recognition for an original speech signal of an original speaker and extract at least one piece of characteristic information among pitch information, vocal intensity information, speech speed information, and vocal tract characteristic information of the original speech, an automatic translation module configured to generate a synthesis-target translation by translating the text data, and a speech synthesis module configured to generate a synthetic sound of the synthesis-target translation.

18 Claims, 7 Drawing Sheets

(51) Int. Cl.
*G10L 13/06* (2013.01)
*G10L 25/24* (2013.01)
*G10L 25/75* (2013.01)

(58) Field of Classification Search
USPC ................................ 704/2, 3, 4, 5, 7, 8, 277
See application file for complete search history.

(56) References Cited

U.S. PATENT DOCUMENTS

| | | | |
|---|---|---|---|
| 2005/0267758 A1* | 12/2005 | Shi | G10L 13/10 704/260 |
| 2008/0133245 A1* | 6/2008 | Proulx | G06F 17/2818 704/277 |
| 2010/0082326 A1* | 4/2010 | Bangalore | G06F 17/289 704/3 |
| 2014/0303958 A1* | 10/2014 | Lee | G06F 17/289 704/2 |
| 2015/0199340 A1 | 7/2015 | Kwon et al. | |
| 2015/0227510 A1 | 8/2015 | Shin et al. | |

\* cited by examiner

AUTOMATIC INTERPRETATION SYSTEM AND METHOD FOR GENERATING SYNTHETIC SOUND HAVING CHARACTERISTICS SIMILAR TO THOSE OF ORIGINAL SPEAKER'S VOICE

CROSS-REFERENCE TO RELATED APPLICATION

This application claims priority to and the benefit of Korean Patent Application No. 10-2016-0025685, filed on Mar. 3, 2016, the disclosure of which is incorporated herein by reference in its entirety.

BACKGROUND

1. Field of the Invention

The present invention relates to automatic interpretation technology, and more particularly, to an automatic interpretation system and method for generating a synthetic sound having similar characteristics to those of an original speaker's voice.

2. Discussion of Related Art

In general, existing automatic interpreters generate neutral synthetic sounds for translated sentences without giving specific considerations to the synthetic speech sounds delivered to the listener. Further advanced technologies also merely propose speech synthesis distinguished by a male or female voice based on the gender of an original speaker.

Even when considering only speech synthesis technologies let alone automatic interpretation, there have been attempts to express emotions, but the attempts did not extend beyond synthesis that is only able to express some emotions including happiness, sadness, anger, etc. based on a given sentence.

As occasions demand, in a conversation system such as a robot, etc., there have been attempts to analyze emotional prosody structures of anger, fear, happiness, sadness, etc. using personal prosody model information of a person who is a conversational partner and then add emotional information to a synthetic sound output by the robot using the analysis results. However, this approach uses vocal characteristics of a conversational partner and differs from automatic interpretation for translating and synthesizing a speaker's own speech. Also, since basic emotions of the conversational partner are defined and emotional information is assigned using the basic emotions, the approach is not appropriate for automatic interpretation that is designed to faithfully deliver the intention and emotion of an original speaker's speech to a conversational partner by imitating speech characteristics of the original speaker for translation and synthesis.

Meanwhile, at a conference in January 2015, working group (WG) 4 Culture and Linguistic Adaptability of the International Organization for Standardization (ISO)/the International Electrotechnical Commission (IEC) joint technical committee (JTC) 1 subcommittee (SC) 35 User Interfaces selected user interface for automatic multilingual interpretation as a new project through voting by member nations.

SUMMARY OF THE INVENTION

The present invention is directed to providing an automatic interpretation system and method for generating interpreted synthetic sounds having characteristics similar to those of an original speaker's voice.

According to an aspect of the present invention, there is provided an automatic interpretation system for generating a synthetic sound having characteristics similar to those of an original speaker's voice, the system including: a speech recognition module configured to generate text data by performing speech recognition for an original speech signal of an original speaker and extract at least one piece of characteristic information among pitch information, vocal intensity information, speech speed information, and vocal tract characteristic information of the original speech; an automatic translation module configured to generate a synthesis-target translation by translating the text data; and a speech synthesis module configured to generate a synthetic sound of the synthesis-target translation.

The speech recognition module may include: a word and sentence extractor configured to extract words and sentences from the analog original speech signal and convert the extracted words and sentences into digital text data; a pitch extractor configured to extract a pitch and a pitch trajectory from the original speech signal; a vocal intensity extractor configured to extract a vocal intensity from the original speech signal; a speech speed extractor configured to measure and extract speech speed from the original speech signal; and a vocal tract characteristic extractor configured to extract a vocal tract parameter from the original speech signal.

The pitch extractor may additionally extract prosody structures from the original speech signal according to intonation phrases.

The vocal intensity extractor may compare the extracted vocal intensity with a gender-specific average vocal intensity acquired from previously built massive male and female conversational speech databases, and store a ratio of the vocal intensity of the original speaker to the average vocal intensity based on a comparison result.

The speech speed extractor may measure the speech speed of the original speech signal in units of at least one of words, sentences, and intonation phrases, compare the measured speech speed and an average speech speed based on numbers of syllables according to the corresponding types of units and acquired from a previously built massive conversational speech database, and store a ratio of the speech speed of the original speaker to the average speech speed based on a comparison result.

The vocal tract characteristic extractor may extract at least one of characteristic parameters of Mel-frequency cepstral coefficient (MFCC) and glottal wave.

When the automatic translation module is a rule-based machine translator, the automatic translation module may extract correspondence information in units of at least one of words, intonation phrases, and sentences corresponding to a language of the original speech and a language of the synthesis-target translation in a translation process.

When the automatic translation module is a statistical machine translator, the automatic translation module may extract correspondence information in units of at least one of words, intonation phrases, and sentences using dictionary information and alignment information of a translation process or using results of chunking in units of words, phrases, and clauses.

The speech synthesis module may include: a preprocessor configured to convert numbers and marks in the synthesis-target translation into characters; a pronunciation converter configured to convert pronunciations corresponding to characters of the converted synthesis-target translation; a prosody processor configured to add intonations and intensities to intonation phrases and sentences in the synthesis-target translation based on the characteristic information of the original speaker; and a synthetic sound generator configured to search for synthesis units of the synthesis-target translation that has been subjected to the prosody processing and generate the synthetic sound of the synthesis-target translation based on search results.

The prosody processor may assign a cadence to the synthesis-target translation based on at least one piece of characteristic information among the pitch information and the vocal intensity information of the original speech signal.

The synthetic sound generator may generate the synthetic sound of the synthesis-target translation based on at least one piece of characteristic information among the speech speed information and the vocal tract characteristic information of the original speech signal.

According to another aspect of the present invention, there is provided a method of generating a synthetic sound having characteristics similar to those of an original speaker's voice in an automatic interpretation system, the method including: generating text data by performing speech recognition for an original speech signal of an original speaker and extracting at least one piece of characteristic information among pitch information, vocal intensity information, speech speed information, and vocal tract characteristic information of the original speech signal; generating a synthesis-target translation by translating the text data; and generating a synthetic sound of the synthesis-target translation.

The extracting of the at least one piece of characteristic information may include additionally extracting prosody structures from the original speech signal according to intonation phrases.

The extracting of the at least one piece of characteristic information may include comparing the extracted vocal intensity with a gender-specific average vocal intensity acquired from previously built massive male and female conversational speech databases and storing a ratio of the vocal intensity of the original speaker to the average vocal intensity based on a comparison result.

The extracting of the at least one piece of characteristic information may include measuring the speech speed of the original speech signal in units of at least one of words, sentences, and intonation phrases, comparing the measured speech speed and an average speech speed based on numbers of syllables according to the corresponding types of units and acquired from a previously built massive conversational speech database, and storing a ratio of the speech speed of the original speaker to the average speech speed based on a comparison result.

The extracting of the at least one piece of characteristic information may include extracting at least one characteristic parameter among characteristic parameters of MFCC and glottal wave.

In case of a rule-based machine translator, the generation of the synthesis-target translation may include extracting correspondence information in units of at least one of words, intonation phrases, and sentences corresponding to a language of the original speech and a language of a translation result in a translation process, and in case of a statistical machine translator, extracting correspondence information in units of at least one of words, intonation phrases, and sentences using dictionary information and alignment information of the interpretation process or using results of chunking in units of words, phrases, and clauses.

The generation of the synthetic sound may include: converting numbers and marks in the synthesis-target translation into characters; converting pronunciations corresponding to characters of the converted synthesis-target translation; processing prosody by adding intonations and intensities to intonation phrases and sentences in the synthesis-target translation based on the characteristic information of the original speaker; and searching for synthesis units of the synthesis-target translation that has been subjected to the prosody processing and generating the synthetic sound of the synthesis-target translation based on search results.

The processing of the prosody may include assigning a cadence to the synthesis-target translation based on at least one piece of characteristic information among the pitch information and the vocal intensity information of the original speech signal.

The generating of the synthetic sound based on the search results may include generating the synthetic sound of the synthesis-target translation based on at least one piece of characteristic information among the speech speed information and the vocal tract characteristic information of the original speech signal.

BRIEF DESCRIPTION OF THE DRAWINGS

The above and other objects, features and advantages of the present invention will become more apparent to those of ordinary skill in the art by describing in detail exemplary embodiments thereof with reference to the accompanying drawings, in which.

DETAILED DESCRIPTION OF EXEMPLARY EMBODIMENTS

Figure 1:
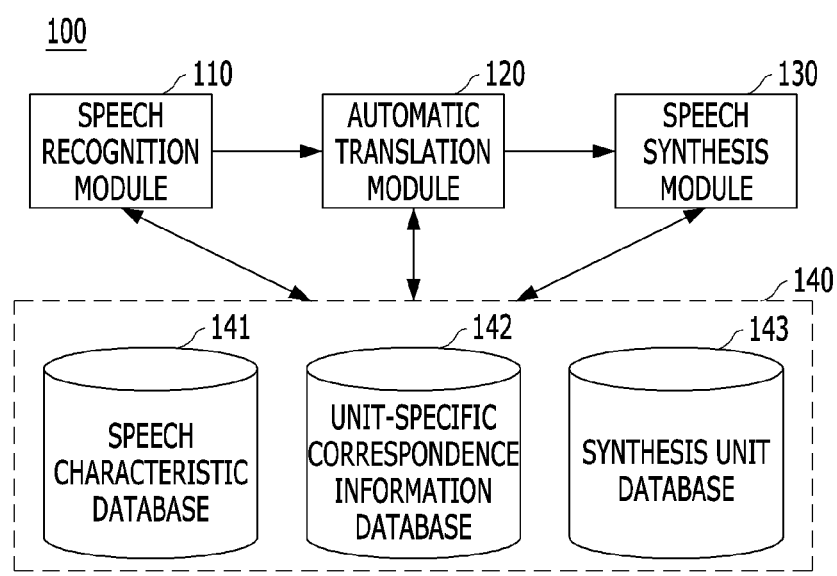
FIG. 1 is a block diagram showing a configuration of an automatic interpretation system for generating a synthetic sound having characteristics similar to those of an original speaker's voice according to an exemplary embodiment of the present invention.

Advantages and features of the present invention and a method of achieving the same will be clearly understood from embodiments described below in detail with reference to the accompanying drawings. However, the present invention is not limited to the following embodiments and may be implemented in various different forms. The embodiments are provided merely for complete disclosure of the present invention and to fully convey the scope of the invention to those of ordinary skill in the art to which the present invention pertains. The present invention is defined only by the scope of the claims. Meanwhile, the terminology used herein is for the purpose of describing the embodiments and is not intended to be limiting of the invention. As used in this specification, the singular form of a word includes the plural unless the context clearly indicates otherwise. The term "comprise" and/or "comprising," when used herein, does not preclude the presence or addition of one or more components, steps, operations, and/or elements other than stated components, steps, operations, and/or elements.

Hereinafter, exemplary embodiments of the present invention will be described in detail with reference to the accompanying drawings. Like components are referred to as like reference numerals as much as possible even through illustrated in different drawings, and in the following description, only parts necessary for understanding operations according to exemplary embodiments of the present invention will be described and other parts will not be described so that the subject matter of the present invention is not obscured.

FIG. 1 is a block diagram showing a configuration of an automatic interpretation system for generating a synthetic sound having characteristics similar to those of an original speaker's voice according to an exemplary embodiment of the present invention.

As shown in FIG. 1, an automatic interpretation system 100 includes a speech recognition module 110, an automatic translation module 120, and a speech synthesis module 130. Information extracted from each module (the speech recognition module 110, the automatic translation module 120, and the speech synthesis module 130) and information used for operations may be stored in a separate database 140.

The speech recognition module 110 receives an original speech signal of an original speech of a speaker (original speaker) and extracts characteristic information of the original speech from the received original speech signal. When the input of the speech of the original speaker is finished, the speech recognition module 110 extracts words and sentences recognized through a general speech recognition procedure and also extracts additional information. Here, the additional information may be pitch information, intensity information, speed information, and vocal tract characteristic information.

Figure 2:
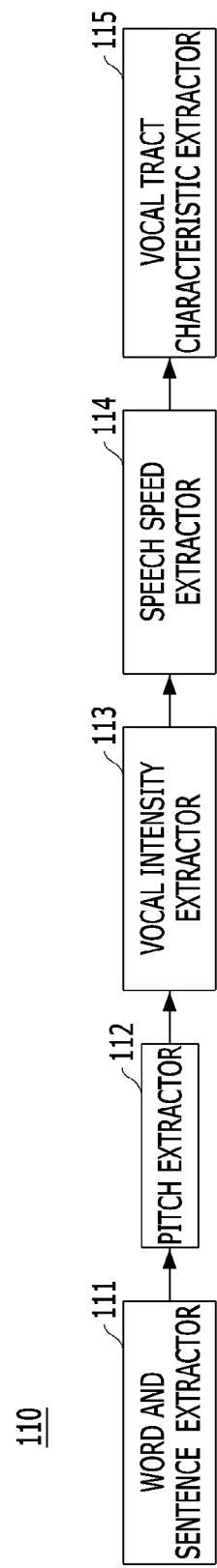
FIG. 2 is a block diagram showing a detailed configuration of a speech recognition module of the automatic interpretation system according to an exemplary embodiment of the present invention.

To this end, as shown in FIG. 2, the speech recognition module 110 includes a word and sentence extractor 111, a pitch extractor 112, a vocal intensity extractor 113, a speech speed extractor 114, and a vocal tract characteristic extractor 115. Information extracted from each of the extractors 111 to 115 of the speech recognition module 110 may be stored in an additional speech characteristic database 141.

The word and sentence extractor 111 generates text data by decoding the original speech signal of the original speaker received through a microphone. At this point, the word and sentence extractor 111 may convert the analog original speech signal into digital text data through speech recognition. Also, the word and sentence extractor 111 calculates accuracy and reliability of the decoding (speech recognition) results.

Further, the word and sentence extractor 111 finds ends of sentences in the original speech signal. At this point, the word and sentence extractor 111 may find starts and ends of sentences by analyzing the original speech signal with an end-point detector (EPD). Moreover, the word and sentence extractor 111 may determine semantic units and ends of sentences in the text data using the text data, the reliability information, and EPD information.

Through this process, the word and sentence extractor 111 may extract words and sentences (speech recognition results) from the original speech signal. For convenience of description, it is assumed below that the original speaker has spoken one sentence, and the single sentence has been extracted from the original speech signal.

The pitch extractor 112 measures pitch information at sentence level and stores the pitch information. Specifically, the pitch extractor 112 may extract pitch information and pitch trajectory information from the original speech signal.

At this point, the pitch extractor 112 also extracts intonation phrase unit information using the speech recognition results of the word and sentence extractor 111 and the pitch and pitch trajectory information of the original speech signal together. Also, the pitch extractor 112 additionally uses the pitch trajectory information for the extracted intonation phrases to extract and store prosody structures, such as L %, LH %, HL %, LH % LHL %, LHLH %, HLH %, HLHL %, LHLHL %, etc. (L: low, H: high, %: boundary tones), according to the intonation phrases of the speech. At this time, the stored prosody structures may vary according to languages.

The vocal intensity extractor 113 measures a vocal intensity of the original speech signal in units of words, sentences, intonation phrases, and so on. Specifically, the vocal intensity extractor 113 measures vocal intensities of the speech actually made by the original speaker for each of the units. The vocal intensity extractor 113 compares the measured vocal intensities with a gender-specific average vocal intensity acquired from previously built massive male and female conversational speech databases. Based on the comparison results, the vocal intensity extractor 113 stores ratios of the vocal intensities of the speech actually made by the original speaker to the average vocal intensity.

The speech speed extractor 114 measures speech speed of the original speech signal in units of words, sentences, intonation phrases, and so on. Specifically, the speech speed extractor 114 measures speech speed of the original speech actually made by the original speaker for each of the units. The speech speed extractor 114 compares the measured speech speeds of the original speech with an average speed based on the number of syllables according to the corresponding types of units and acquired from the previously built conversational speech databases. Based on the comparison results, the speech speed extractor 114 stores ratios of the actual speech speeds to the average speed.

The vocal tract characteristic extractor 115 extracts vocal tract characteristic parameters including Mel-frequency cepstral coefficient (MFCC), etc. from the original speech signal and stores the vocal tract characteristic parameters. As occasions demand, the vocal tract characteristic extractor 115 may also extract a characteristic parameter for glottal wave and store the extracted characteristic parameter. The extracted characteristic parameters are information corresponding to the tone of the original speaker.

The automatic translation module 120 translates the original speech using the speech recognition results of the speech recognition module 110. Specifically, the automatic translation module 120 generates a synthesis-target translation (translated text data) by translating the text data of the original speech signal generated by the speech recognition module 110 into another language. For example, the automatic translation module 120 may convert Korean text data into English text data through translation.

At this point, the automatic translation module 120 may extract and store unit-specific correspondence information between the speech recognition results (the characteristic information of the original speech) and the translation results. Alternatively, the automatic translation module 120 may extract and store unit-specific correspondence information through post-processing of the automatic translation results and the speech recognition results.

When the automatic translation module 120 is a rule-based machine translator, the rule-based machine translator may obtain word, intonation phrase, and sentence information corresponding to both languages together in the translation process. When the automatic translation module 120 is a statistical machine translator, the statistical machine translator uses dictionary information and alignment information of the translation process or performs chunking, etc. in units of words, phrases, and clauses and causes the chunks to correspond to the original sentence (the speech recognition results of the original speech) and the translated sentence, thereby extracting correspondence information of words and intonation phrases. When final translation results are used, sentences also correspond to each other.

The corresponding words, intonation phrases, and sentence information may be stored in a unit-specific correspondence information database 142 and used thereafter in a process of the speech synthesis module 130 generating and converting a synthetic sound.

Figure 3:
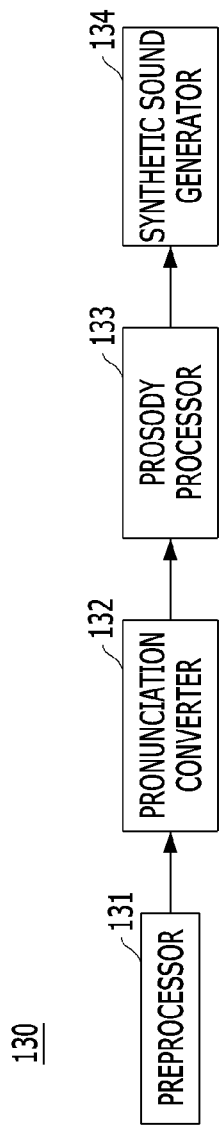
FIG. 3 is a block diagram showing a detailed configuration of a speech synthesis module of the automatic interpretation system according to an exemplary embodiment of the present invention.

The speech synthesis module 130 generates and converts a synthetic sound of the translation for possessing characteristics similar to those of the original speaker's voice. To this end, as shown in FIG. 3, the speech synthesis module 130 includes a preprocessor 131, a pronunciation converter 132, a prosody processor 133, and a synthetic sound generator 134.

First, the preprocessor 131 converts numbers, marks, etc. in the text data (synthesis-target translation) translated by the automatic translation module 120 into characters. For example, the preprocessor 131 converts numbers and marks, such as "1" and "#" in the synthesis-target translation into characters such as "one (or single)" and "sharp."

Subsequently, the pronunciation converter 132 performs a pronunciation conversion for characters of the synthesis-target translation. For example, the pronunciation converter 132 may convert the synthesis-target translation converted into characters into pronunciation data for actual pronunciation according to previously stored phonetic symbols.

The prosody processor 133 searches for an intonation phrase in the synthesis-target translation and adds intonation and intensity to the intonation phrase and the sentence.

First, to generate a synthetic sound having characteristics similar to those of the original speaker's voice, the prosody processor 133 sets the base pitch of the synthesis-target translation that has been subjected to the pronunciation conversion to the pitch of the original speaker. When adding intonation to the sentence, the prosody processor 133 does not add intonation based on the text data alone but compares the number of intonation phrases of the original speech with the number of intonation phrases of the synthesis-target translation and assigns a cadence according to the comparison result.

When the number of intonation phrases of the original speech corresponds to the number of intonation phrases of the synthesis-target translation, a cadence is assigned so that the translation has the same characteristic as an intonation phrase prosody structure of the original speech corresponding to the translation. For example, assuming that the sound of the phrase "Have you eaten?" is translated into the sentence "밥 먹었어요" in an automatic interpretation from English to Korean, when a cadence is assigned using text data alone, the intonation "L %" is assigned. When the intonation "L %" is assigned, a meaning of the sentence "밥 먹었어요" becomes "I have eaten" in English, which is a sentence having a meaning different from the meaning of the original sentence.

However, when the number of intonation phrases of the original speech is the same as the number of intonation phrases of the synthesis-target translation and the intonation phrase cadence of the original speech is measured as "LH %," the prosody processor 133 assigns the cadence "LH %" to the corresponding intonation phrase "밥 먹었어요" using the information indicating that the intonation phrase cadence is "LH %." When the cadence "LH %" is assigned, the aforementioned Korean sentence "밥 먹었어요" has the meaning of "Have you eaten?" which is the meaning of the original sentence, so that the same intention as the intention of the original speech is delivered.

At this point, a prosody structure is not generated to simply correspond to an intonation phrase having the same cadence as the original speech but is generated to correspond to a natural intonation phrase prosody structure having the same intention as the original speech in consideration of prosody structures of the original language and the listener's target language. Though this process, it is possible to generate an interpreted synthetic sound having a cadence of an emotion and an intention similar to those of the original speech.

Next, even when assigning an intensity, the prosody processor 133 sets the gender of the original speaker as a basis and then assigns the intensity to the whole sentence without degrading the natural intensity characteristic that needs to be neutrally generated so that the sentence has the same ratio as that measured from the original speech. At this point, when intensity higher or lower than a reference value preset for a particular word and intonation phrase is measured in the original speech, the corresponding word and intonation phrase in the generated synthetic sound are also assigned intensities to have the same ratio with respect to the reference value, and intensities of remaining words and intonation phrases are adjusted together so that the original speech and the synthetic sound may have an overall intensity at the same level. In this way, it is possible to generate an interpreted synthetic sound with an intensity of an emotion and an intention similar to those of the original speech.

Subsequently, the synthetic sound generator 134 searches a synthesis unit database 143 for synthesis units of the synthesis-target translation (input sentence) that has been subjected to the prosody processing, connects synthesis units using the search results to generate a synthetic sound, and outputs the generated synthetic sound. A speech speed which is neutrally generated in a general case is adjusted to have the same ratio for the whole sentence as the original speech within a range in which the natural characteristic is not degraded. At this point, when a change in speech speed greater or less than a preset reference value is detected in a particular word and intonation phrase of the original speech, the synthetic sound generator 134 increases or reduces speeds of the corresponding word and intonation phrase of the synthetic sound according to the speed of the original speech and relatively adjusts speeds of remaining words and intonation phrases, thereby maintaining the overall speed to have the same ratio. In this way, it is possible to adjust speed so that an interpreted synthetic sound with an emotion and an intention similar to those of the original speech can be generated.

Finally, the synthetic sound generator 134 performs a tone conversion on the time axis or the frequency axis within a range in which the natural characteristic is not degraded so that a tone information characteristic parameter can have a value similar to that of a tone information characteristic parameter of the original speaker. After this conversion, the tone of a final synthetic sound becomes similar to the tone of the original speaker, and it is possible to generate an interpreted synthetic sound of an emotion and an intention similar to those of the original speech.

As described above, according to an exemplary embodiment of the present invention, it is possible to remarkably improve the natural characteristic compared to an existing automatic interpreter, which gives a user a feeling of having a talk with a machine, by delivering an interpreted synthetic sound having characteristics similar to those of a speaker's intention and emotion to a listener during automatic interpretation. Also, during a conversation with a foreigner, it is possible to understand the speaker's speech more naturally, and thus automatic interpretation performance can also be improved.

Further, according to an exemplary embodiment of the present invention, speech characteristics of each conversational partner are delivered as they are, and thus it is possible to clearly know who is currently speaking during automatic group interpretation in which several people speak simultaneously.

Moreover, according to an exemplary embodiment of the present invention, vocal characteristics of an original speaker are delivered as they are through an interpreted synthetic sound, and thus it is possible to eventually realize a feeling in a user of directly and naturally having a talk with another person rather than through an automatic interpretation machine.

Figure 4:
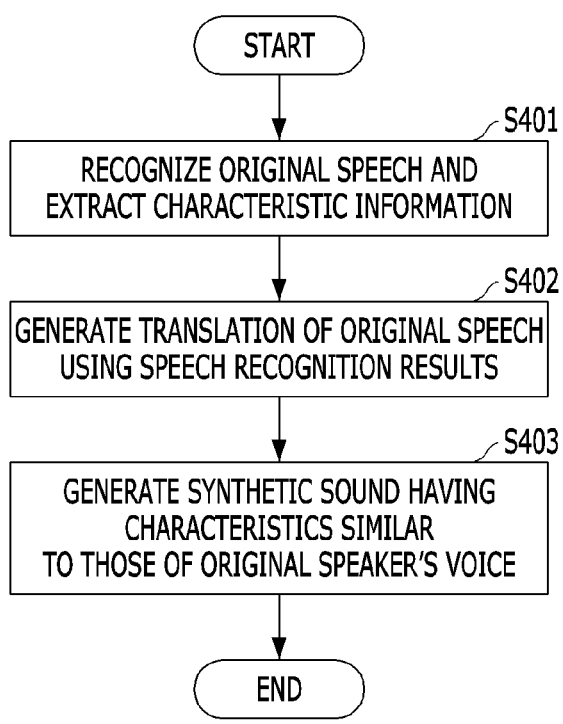
FIG. 4 is a flowchart of an automatic interpretation method of generating a synthetic sound having characteristics similar to those of an original speaker's voice according to an exemplary embodiment of the present invention.

FIG. 4 is a flowchart of an automatic interpretation method of generating a synthetic sound having characteristics similar to those of an original speaker's voice according to an exemplary embodiment of the present invention.

Unless particularly mentioned, it is assumed that each operation is performed by the automatic interpretation system 100 according to an exemplary embodiment of the present invention.

First, the automatic interpretation system 100 receives speech data of an original speech made by a speaker (original speaker) and extracts characteristic information of the original speech from the received speech data. Specifically, when input of the speech of the original speaker is finished, the automatic interpretation system 100 extracts words and sentences recognized through a general speech recognition procedure and also extracts additional information. Here, the additional information may be pitch information, intensity information, speed information, and vocal tract characteristic information.

The automatic interpretation system 100 generates text data by decoding an original speech signal of the original speaker received through a microphone. At this point, the automatic interpretation system 100 may convert the analog original speech signal into digital text data through speech recognition. Also, the automatic interpretation system 100 calculates accuracy and reliability of the decoding (speech recognition) results.

Further, the automatic interpretation system 100 finds ends of sentences in the original speech signal. At this point, the automatic interpretation system 100 may find starts and ends of sentences by analyzing the original speech signal with an EPD. Moreover, the automatic interpretation system 100 may determine semantic units and ends of sentences in the text data using the text data, the reliability information, and EPD information.

Through this process, the automatic interpretation system 100 may extract words and sentences (speech recognition results) from the original speech signal. For convenience of description, it is assumed below that the original speaker has spoken one sentence, and the single sentence has been extracted from the original speech signal.

Figure 5:
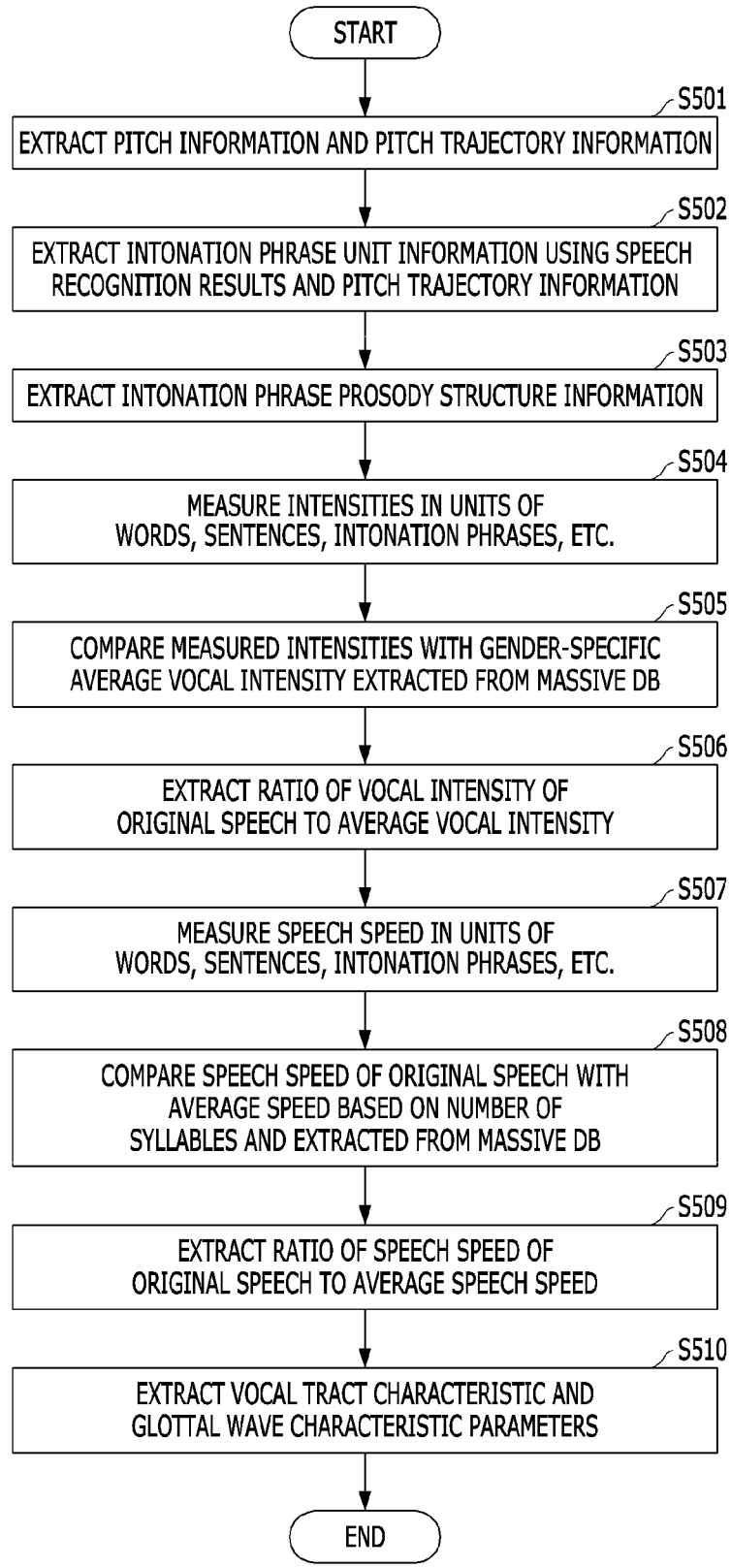
FIG. 5 is a flowchart of a method of extracting characteristic information of an original speech according to an exemplary embodiment of the present invention.

The automatic interpretation system 100 can extract characteristic information of the original speech through the operational flow of FIG. 5.

FIG. 5 is a flowchart of a method of extracting characteristic information of an original speech according to an exemplary embodiment of the present invention.

The automatic interpretation system 100 extracts pitch information and pitch trajectory information at sentence level of the original speech signal (S501).

Also, the automatic interpretation system 100 extracts intonation phrase unit information using the speech recognition results and the pitch and pitch trajectory information of the original speech signal together (S502).

Further, the automatic interpretation system 100 extracts intonation phrase prosody structure information of extracted intonation phrases (S503). For example, the automatic interpretation system 100 additionally uses the pitch trajectory information for the extracted intonation phrases also to extract and store prosody structures, such as L %, LH %, HL %, LH % LHL %, LHLH %, HLH %, HLHL %, LHLHL %, etc. (L: low, H: high, %: boundary tones), according to the intonation phrases of the speech. At this point, the stored prosody structures may vary according to languages.

The automatic interpretation system 100 measures vocal intensities of the original speech signal in units of words, sentences, intonation phrases, and so on (S504). Specifically, the automatic interpretation system 100 measures vocal intensities of the speech actually made by the original speaker for each of the units.

Also, the automatic interpretation system 100 compares the measured vocal intensities with a gender-specific average vocal intensity acquired from previously built massive male and female conversational speech databases (S505).

Based on the comparison results, the automatic interpretation system 100 extracts and stores ratios of the vocal intensities of the speech actually made by the original speaker to the average vocal intensity (S506).

The automatic interpretation system 100 measures speech speed of the original speech signal in units of words, sentences, intonation phrases, and so on (S507). Specifically, the automatic interpretation system 100 measures speech speed of the original speech actually made by the original speaker in each type of units.

Also, the automatic interpretation system 100 compares the measured speech speeds of the original speech with an average speed based on the number of syllables according to the corresponding types of units and acquired from the previously built conversational speech databases (S508).

Based on the comparison results, the automatic interpretation system 100 extracts and stores ratios of the actual speech speeds to the average speed (S509).

The automatic interpretation system 100 extracts vocal tract characteristic parameters including an MFCC, etc. from the original speech signal and stores the vocal tract characteristic parameters (S510). As occasions demand, the automatic interpretation system 100 may also extract a characteristic parameter for glottal wave and store the extracted characteristic parameter. The extracted characteristic parameters are information corresponding to the tone of the original speaker.

Referring back to the operational flowchart of FIG. 4, the automatic interpretation system 100 translates the original speech using the speech recognition results of operation S401 (S402). Specifically, the automatic interpretation system 100 translates the text data of the original speech signal generated in operation S401 into another language. For example, Korean text data may be converted into English text data through translation.

At this point, the automatic interpretation system 100 may extract and store unit-specific correspondence information between the speech recognition results (the characteristic information of the original speech) and the translation results. Alternatively, the automatic interpretation system 100 may extract and store unit-specific correspondence information through post-processing of the automatic translation results and the speech recognition results.

When the automatic interpretation system 100 is a rule-based machine translator, the rule-based machine translator may obtain word, intonation phrase, and sentence information corresponding to both languages together in the translation process. When the automatic interpretation system 100 is a statistical machine translator, the statistical machine translator uses dictionary information and alignment information of the translation process or performs chunking, etc. in units of words, phrases, and clauses and causes the chunks to correspond to the original sentence (the speech recognition results of the original speech) and the translated sentence, thereby extracting correspondence information of words and intonation phrases. When final translation results are used, sentences also correspond to each other.

The corresponding words, intonation phrases, and sentence information may be stored in the unit-specific correspondence information database 142 and used thereafter in a process of generating and converting a synthetic sound.

The automatic interpretation system 100 generates and converts a synthetic sound of the translation for possessing characteristics similar to those of the original speaker's voice (S403).

Figure 6:
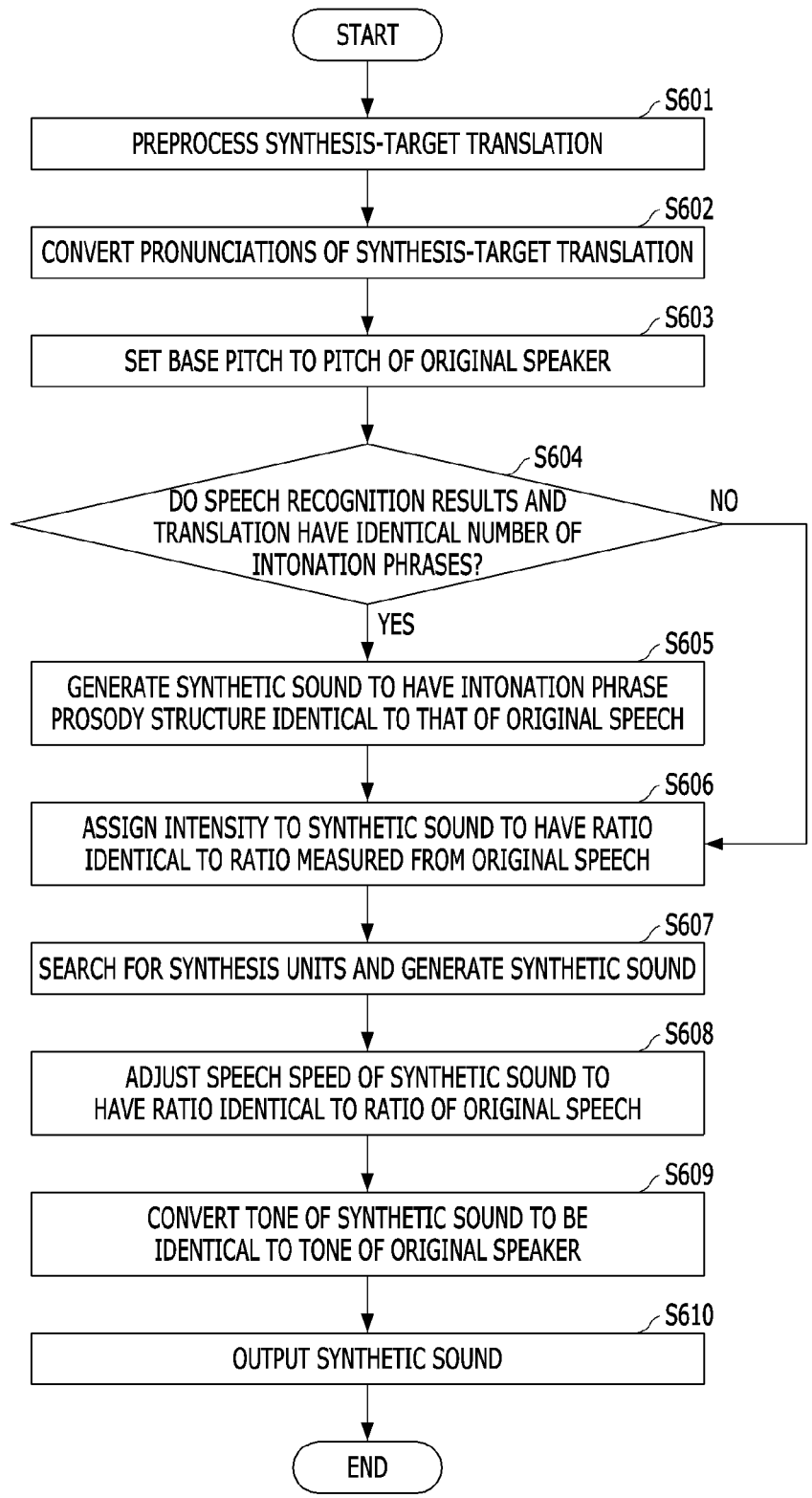
FIG. 6 is a flowchart of a method of generating and converting a synthetic sound having characteristics of an original speech according to an exemplary embodiment of the present invention.

At this point, the automatic interpretation system 100 can generate and convert a synthetic sound through the operational flow of FIG. 6.

FIG. 6 is a flowchart of a method of generating and converting a synthetic sound having characteristics of an original speech according to an exemplary embodiment of the present invention.

First, the automatic interpretation system 100 preprocesses the text data (synthesis-target translation) translated in operation S402 (S601). Specifically, the automatic interpretation system 100 converts numbers, marks, etc. in the text data into characters. For example, the automatic interpretation system 100 converts numbers and marks, such as "1" and "#" in the synthesis-target translation into characters such as "one (or single)" and "sharp."

Subsequently, the automatic interpretation system 100 performs a pronunciation conversion for characters of the synthesis-target translation (S602). For example, the automatic interpretation system 100 may convert the synthesis-target translation converted into characters into pronunciation data for actual pronunciation according to previously stored phonetic symbols.

To generate a synthetic sound having characteristics similar to those of the original speaker's voice, the automatic interpretation system 100 sets the base pitch of the synthesis-target translation that has been subjected to the pronunciation conversion to the pitch of the original speaker (S603). When adding intonation to the sentence, the automatic interpretation system 100 does not add intonation based on the text data alone but compares the number of intonation phrases of the original speech with the number of intonation phrases of the synthesis-target translation (S604) and assigns a cadence according to the comparison result.

When the number of intonation phrases of the original speech corresponds to the number of intonation phrases of the synthesis-target translation, a cadence is assigned so that the translation has the same characteristic as an intonation phrase prosody structure of the original speech corresponding to the translation (S605). For example, assuming that the sound of phrase "Have you eaten?" is translated into the sentence "밥 먹었어요" in an automatic interpretation from English to Korean, when a cadence is assigned using text data alone, the intonation "L %" is assigned. When the intonation "L %" is assigned, a meaning of the sentence "밥 먹었어요" becomes "I have eaten" in English, which is a sentence having a meaning different from the meaning of the original sentence.

However, when the number of intonation phrases of the original speech is the same as the number of intonation phrases of the synthesis-target translation and the intonation phrase cadence of the original speech is measured as "LH %," the automatic interpretation system 100 assigns the cadence "LH %" to the corresponding intonation phrase "밥 먹었어요" using the information indicating that the intonation phrase cadence is "LH %." When the cadence "LH %" is assigned, the aforementioned Korean sentence "밥 먹었어요" has the meaning of "Have you eaten?" which is the meaning of the original sentence, so that the same intention as the intention of the original speech is delivered.

At this point, a prosody structure is not generated to simply correspond to an intonation phrase having the same cadence as the original speech but is generated to correspond to a natural intonation phrase prosody structure having the same intention as the original speech in consideration of prosody structures of the original language and the listener's target language. Though this process, it is possible to generate an interpreted synthetic sound having a cadence of an emotion and an intention similar to those of the original speech.

In addition, the automatic interpretation system 100 assigns intensities to the synthetic sound so that the synthetic sound has the same ratio as a value measured from the original speech (S606). Even when assigning an intensity, the automatic interpretation system 100 sets the gender of the original speaker as a basis and then assigns the intensities to the whole sentence without degrading the natural intensity characteristic that needs to be neutrally generated so that the sentence has the same ratio as that measured from the original speech. At this time, when an intensity higher or lower than a reference value preset for a particular word and intonation phrase is measured in the original speech, the corresponding word and intonation phrase in the generated synthetic sound are also assigned intensities to have the same ratio with respect to the reference value, and intensities of remaining words and intonation phrases are adjusted together so that the original speech and the synthetic sound may have an overall intensity at the same level. In this way, it is possible to generate an interpreted synthetic sound with an intensity of an emotion and an intention similar to those of the original speech.

Subsequently, the automatic interpretation system 100 searches the synthesis unit database 143 for synthesis units of the synthesis-target translation (input sentence) that has been subjected to the prosody processing, connects synthesis units using the search results to generate a synthetic sound, and outputs the generated synthetic sound (S607). A speech speed which is neutrally generated in a general case is adjusted to have the same ratio for the whole sentence as the original speech within a range in which the natural characteristic is not degraded.

For example, the automatic interpretation system 100 adjusts speech speed of the synthetic sound to have the same ratio as the original speech (S608). When a change in speech speed greater or less than a preset reference value is detected in a particular word and intonation phrase of the original speech, the automatic interpretation system 100 increases or reduces speeds of the corresponding word and intonation phrase of the synthetic sound according to the speed of the original speech and relatively adjusts speeds of remaining words and intonation phrases, thereby maintaining the overall speed to have the same ratio. In this way, it is possible to adjust speed so that an interpreted synthetic sound with an emotion and an intention similar to those of the original speech can be generated.

Also, the automatic interpretation system 100 converts the tone of the synthetic sound to be similar to the tone of the original speaker (S609). Specifically, the automatic interpretation system 100 performs a tone conversion on the time axis or the frequency axis within a range in which the natural characteristic is not degraded so that a tone information characteristic parameter can have a value similar to that of a tone information characteristic parameter of the original speaker. After this conversion, the tone of a final synthetic sound becomes similar to the tone of the original speaker, and it is possible to generate an interpreted synthetic sound with an emotion and an intention similar to those of the original speech.

Subsequently, the automatic interpretation system 100 can provide the interpreted synthetic sound having the characteristics of the original speaker by outputting the generated synthetic sound (S610).

As described above, according to an exemplary embodiment of the present invention, it is possible to remarkably improve the natural characteristic compared to an existing automatic interpreter, which gives a user a feeling of having a talk with a machine, by delivering an interpreted synthetic sound having characteristics similar to those of a speaker's intention and emotion to a listener during automatic interpretation. Also, during a conversation with a foreigner, it is possible to understand the speaker's speech more naturally, and thus automatic interpretation performance can also be improved.

Further, according to an exemplary embodiment of the present invention, speech characteristics of each conversational partner are delivered as they are, and thus it is possible to clearly know who is currently speaking during automatic group interpretation in which several people speak simultaneously.

Moreover, according to an exemplary embodiment of the present invention, vocal characteristics of an original speaker are delivered as they are through an interpreted synthetic sound, and thus it is possible to eventually realize a feeling in a user of directly and naturally having a talk with another person rather than through an automatic interpretation machine.

Figure 7:
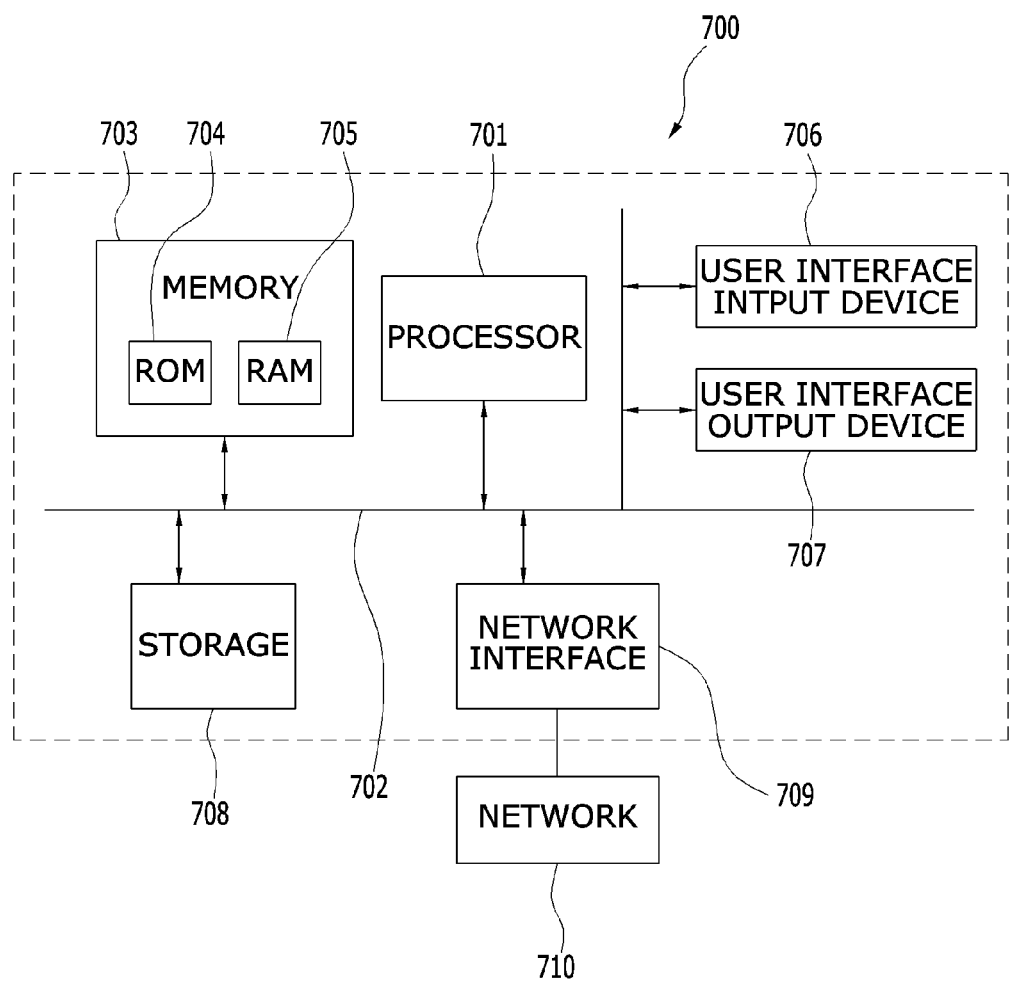
FIG. 7 is a block diagram illustrating a computer system for the present invention.

An embodiment of the present invention may be implemented in a computer system, e.g., as a computer readable medium. As shown in FIG. 7, a computer system 700 may include one or more of a processor 701, a memory 703, a user input device 706, a user output device 707, and a storage 708, each of which communicates through a bus 702. The computer system 700 may also include a network interface 709 that is coupled to a network 710. The processor 701 may be a central processing unit (CPU) or a semiconductor device that executes processing instructions stored in the memory 703 and/or the storage 708. The memory 703 and the storage 708 may include various forms of volatile or non-volatile storage media. For example, the memory may include a read-only memory (ROM) 704 and a random access memory (RAM) 705.

Accordingly, an embodiment of the invention may be implemented as a computer implemented method or as a non-transitory computer readable medium with computer executable instructions stored thereon. In an embodiment, when executed by the processor, the computer readable instructions may perform a method according to at least one aspect of the invention.

It will be apparent to those skilled in the art that various modifications can be made to the above-described exemplary embodiments of the present invention without departing from the spirit or scope of the invention. Thus, it is intended that the present invention covers all such modifications provided they come within the scope of the appended claims and their equivalents.

What is claimed is:

1. An automatic interpretation system for generating a synthetic sound having characteristics similar to those of an original speaker's voice, the system comprising:
  a processor; and
  a non-transitory computer readable medium having computer executable instructions stored thereon which, when executed by the processor, performs the following method:
  generating text data, using a speech recognition module, by performing speech recognition for an original speech signal of an original speaker and extract one or more pieces of characteristic information among pitch information, vocal intensity information, speech speed information, and vocal tract characteristic information of an original speech;
  generating, using an automatic translation module, a synthesis-target translation by translating the text data; and
  generating, using a speech synthesis module, a synthetic sound of the synthesis-target translation,
  wherein the speech recognition module includes a speech speed extractor measuring a speech speed of the original speech signal in units of one or more of words, sentences, and intonation phrases, comparing the measured speech speed and an average speech speed, the average speech speed being based on numbers of syllables according to corresponding types of units and acquired from one or more previously built massive male and female conversational speech databases, and storing a ratio of the speech speed of the original speaker to the average speech speed based on a comparison result.

2. The automatic interpretation system of claim 1, wherein the speech recognition module further includes:
  a word and sentence extractor configured to extract words and sentences from the original speech signal and convert the extracted words and sentences into the text data;
  a pitch extractor configured to extract a pitch and a pitch trajectory from the original speech signal;
  a vocal intensity extractor configured to extract a vocal intensity from the original speech signal; and
  a vocal tract characteristic extractor configured to extract a vocal tract parameter from the original speech signal.

3. The automatic interpretation system of claim 2, wherein the pitch extractor additionally extracts prosody structures from the original speech signal according to intonation phrases.

4. The automatic interpretation system of claim 2, wherein the vocal intensity extractor compares the extracted vocal intensity with a gender-specific average vocal intensity acquired from one or more of previously built massive male and female conversational speech databases and stores a ratio of the vocal intensity of the original speaker to the average vocal intensity based on a comparison result.

5. The automatic interpretation system of claim 2, wherein the vocal tract characteristic extractor extracts at least one of characteristic parameters of a Mel-frequency cepstral coefficient (MFCC) and a glottal wave.

6. The automatic interpretation system of claim 1, wherein, when the automatic translation module is a rule-based machine translator, the automatic translation module extracts correspondence information in units of one or more of words, intonation phrases, and sentences corresponding to a language of the original speech and a language of the synthesis-target translation in a translation process.

7. The automatic interpretation system of claim 1, wherein, when the automatic translation module is a statistical machine translator, the automatic translation module extracts correspondence information in units of one or more of words, intonation phrases, and sentences using dictionary information and alignment information of a translation process or using results of chunking in units of words, phrases, and clauses.

8. The automatic interpretation system of claim 1, wherein the speech synthesis module further includes:
a preprocessor configured to convert numbers and marks in the synthesis-target translation into characters;
a pronunciation converter configured to convert pronunciations to correspond to the characters of the converted synthesis-target translation; and
a synthetic sound generator configured to search for synthesis units of the synthesis-target translation that has been subjected to the prosody processing and generate the synthetic sound of the synthesis-target translation based on search results.

9. The automatic interpretation system of claim 8, wherein the synthetic sound generator generates the synthetic sound of the synthesis-target translation based on the speech speed information of the original speech signal, the vocal tract characteristic information of the original speech signal, or both.

10. A method of generating a synthetic sound having characteristics similar to those of an original speaker's voice in an automatic interpretation system, the method comprising:
generating text data by performing speech recognition for an original speech signal of an original speaker and extracting one or more pieces of characteristic information among pitch information, vocal intensity information, speech speed information, and vocal tract characteristic information of the original speech signal;
generating a synthesis-target translation by automatically translating the text data; and
generating a synthetic sound of the synthesis-target translation,
wherein the extracting of the one or more pieces of characteristic information includes:
measuring a speech speed of the original speech signal in units of one or more of words, sentences, and intonation phrases;
comparing the measured speech speed and an average speech speed, the average speech speed being based on numbers of syllables according to corresponding types of units and acquired from one or more previously built massive male and female conversational speech databases; and
storing a ratio of the speech speed of the original speaker to the average speech speed based on a comparison result.

11. The method of claim 10, wherein the extracting of the one or more pieces of characteristic information further includes additionally extracting prosody structures from the original speech signal according to the intonation phrases.

12. The method of claim 10, wherein the comparison result is a first comparison result, and
wherein the extracting of the one or more pieces of characteristic information further includes:
comparing a vocal intensity with a gender-specific average vocal intensity acquired from the one or more previously built massive male and female conversational speech databases to generate a second comparison result; and
storing a ratio of the vocal intensity of the original speaker to the average vocal intensity based on the second comparison result.

13. The method of claim 10, wherein the extracting of the one or more pieces of characteristic information further includes extracting at least one of characteristic parameters of a Mel-frequency cepstral coefficient (MFCC) and a glottal wave.

14. The method of claim 10, wherein in case of a rule-based machine translator, the generating of the synthesis-target translation includes extracting correspondence information in units of one or more of words, intonation phrases, and sentences corresponding to a language of the original speech and a language of a translation result in a translation process, and in case of a statistical machine translator, the generating of the synthesis-target translation includes extracting correspondence information in units of one or more of words, intonation phrases, and sentences using dictionary information and alignment information of the interpretation process or using results of chunking in units of words, phrases, and clauses.

15. The method of claim 10, wherein the generating of the synthetic sound includes:
converting numbers and marks in the synthesis-target translation into characters;
converting pronunciations to correspond to the characters of the converted synthesis-target translation;
processing prosody by adding intonations and intensities to intonation phrases and sentences in the synthesis-target translation based on the characteristic information of the original speaker; and
searching for synthesis units of the synthesis-target translation that has been subjected to the prosody processing and generating the synthetic sound of the synthesis-target translation based on search results.

16. The method of claim 15, wherein the processing of the prosody includes assigning a cadence to the synthesis-target translation based on the pitch information of the original speech signal, the vocal intensity information of the original speech signal, or both.

17. The method of claim 15, wherein the generating of the synthetic sound based on the search results includes generating the synthetic sound of the synthesis-target translation based on the speech speed information of the original speech, the vocal tract characteristic information of the original speech signal, or both.

18. A method of generating a synthetic sound in an automatic interpretation system, the method comprising:

generating text data by performing speech recognition for an original speech signal of an original speaker and extracting one or more pieces of characteristic information among pitch information, vocal intensity information, speech speed information, and vocal tract characteristic information of the original speech signal;

generating a synthesis-target translation by automatically translating the text data; and generating a synthetic sound of the synthesis-target translation, wherein the extracting of the one or more pieces of characteristic information includes:

comparing a vocal intensity with a gender-specific average vocal intensity acquired from one or more previously built massive male and female conversational speech databases; and storing a ratio of the vocal intensity of the original speaker to the average vocal intensity based on a comparison result.

* * * * *